(12) United States Patent
Takasaki et al.

(10) Patent No.: US 6,748,847 B2
(45) Date of Patent: Jun. 15, 2004

(54) BRAKE BOOSTER

(75) Inventors: Yoshiyasu Takasaki, Saitama-Ken (JP);
Hiroyuki Yamaga, Saitama-Ken (JP)

(73) Assignee: Bosch Automotive Systems Corporation, Tokyo (JP)

(*) Notice: Subject to any disclaimer, the term of this patent is extended or adjusted under 35 U.S.C. 154(b) by 62 days.

(21) Appl. No.: 10/268,868

(22) Filed: Oct. 10, 2002

(65) Prior Publication Data
US 2003/0107264 A1 Jun. 12, 2003

(30) Foreign Application Priority Data
Dec. 7, 2001 (JP) .................................. 2001-373836

(51) Int. Cl.$^7$ ................................................ F15B 13/16
(52) U.S. Cl. ...................................................... 91/367
(58) Field of Search .................... 91/367, 369.2

(56) References Cited
U.S. PATENT DOCUMENTS
6,634,275 B2 * 10/2003 Yamaga et al. ............... 91/367
* cited by examiner Primary Examiner—Edward K. Look
Assistant Examiner—Michael Leslie
(74) Attorney, Agent, or Firm—Flynn, Thiel, Boutell & Tanis, P.C.

(57) ABSTRACT

A brake booster 1 includes a valve mechanism 6, and a solenoid 8 which operates the valve mechanism 6. When the solenoid 8 is energized, a solenoid plunger 26 and a valve seat member 11 move rearward relative to a valve body 3, whereby the valve mechanism 6 is operated to actuate the brake booster 1 without depressing a brake pedal. A core member 27 which forms a magnetic path for the solenoid 8 is disposed rearward of the solenoid plunger 26 so as to be movable axially of the valve body and so as to move in linked relationship with a valve plunger 13. The invention allows the size of the solenoid 8 to be reduced.

6 Claims, 4 Drawing Sheets

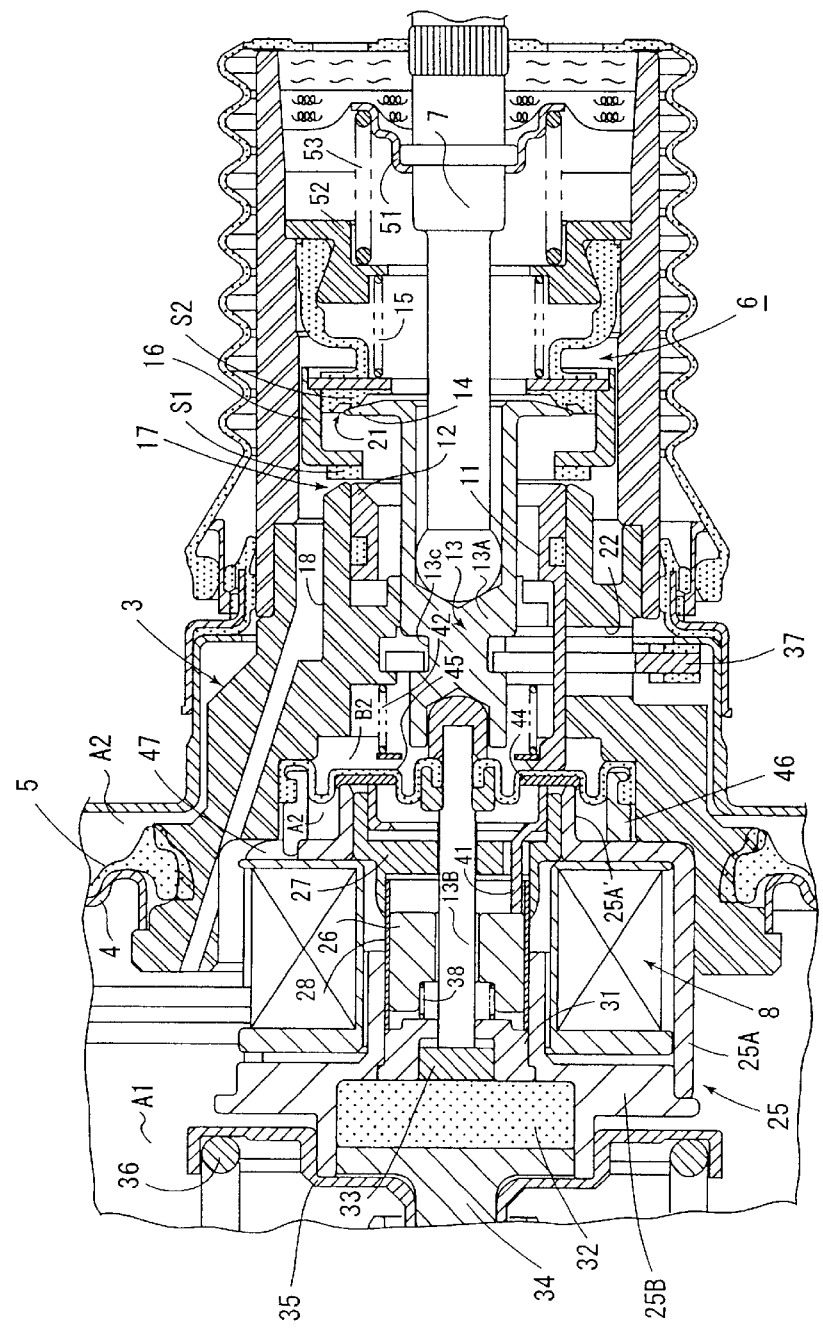
Fig. 5 Prior Art (Japanese Patent Application No. 222.138/2001)

BRAKE BOOSTER

FIELD OF THE INVENTION

The present invention relates to a booster as may be used in a brake of an automobile, and more particularly, to an improvement of a valve mechanism of a brake booster which includes a solenoid which can be energized to operate the valve mechanism.

DESCRIPTION OF THE PRIOR ART

A brake booster is known in the art comprising a valve body slidably disposed within a housing, a power piston mounted on the valve body to partition the interior of the housing into a constant pressure chamber and a variable pressure chamber, a valve mechanism mounted on the valve body to supply a fluid to or to displace it from the variable pressure chamber, an input shaft to operate the valve mechanism, and a solenoid for driving a solenoid plunger which is slidably mounted on the valve body reciprocatively to operate the valve mechanism.

A conventional brake booster as mentioned above suffers from a drawback that when a brake reaction is transmitted to the solenoid plunger as the solenoid is energized, the reaction which is transmitted to the solenoid plunger experiences a large variation in magnitude. Accordingly, there has been a difficulty in controlling a brake output with a high accuracy by controlling a current or a voltage applied to the solenoid. Accordingly, to eliminate such disadvantage, the present Applicant has previously proposed a brake booster having an improved valve mechanism in Japanese Patent Application No. 222,138/2001, as illustrated in FIG. 5 of the present Application, for example.

As shown in FIG. 5, in the cited Application No. 222,138/2001, a tubular, second vacuum valve seat member 11 is slidably mounted on a valve body 3 and a second vacuum valve seat 12 is formed on the rear end of the second vacuum valve seat member 11. When a solenoid 8 is energized, a solenoid plunger 26 drives the second vacuum valve seat member 11 rearward toward a valve element 16. In this manner, the second vacuum valve seat 12 becomes seated upon the valve element 16 before an atmosphere valve seat 14 is removed from the valve element 16, thus allowing the brake booster to be actuated without depressing a brake pedal.

However, in the brake booster proposed in the cited Application No. 222,138/2001, a core member 27 which defines a magnetic path for the solenoid 8 is fixedly mounted on the valve body 3 at a location rearward of the solenoid plunger 26 within the valve body 3. When the solenoid 8 is energized, the solenoid plunger 26 is driven rearward relative to the valve body 3 and thus, there has been a need for the provision of a clearance between the solenoid plunger 26 and the core member 27 when the brake booster is not actuated which is sufficient to avoid an abutment between the both members when the solenoid 8 is energized.

However, when a clearance is maintained between the solenoid plunger and the core member which is located rearward thereof when the brake booster is not actuated, it becomes necessary to increase the magnitude of the current which energizes the solenoid in order to move the solenoid plunger. Consequently, in the cited Application No. 222,138/2001, the solenoid increases in size, leading to an increased size of the brake booster.

SUMMARY OF THE INVENTION

In view of the foregoing, the present invention relates to a brake booster comprising a valve body slidably disposed within a housing, a power piston mounted on the valve body for partitioning the interior of the housing into a constant pressure chamber and a variable pressure chamber, a valve mechanism mounted on the valve body for supplying a fluid to or displacing it from the variable pressure chamber, an input shaft for operating the valve mechanism, and a solenoid for driving a solenoid plunger which is slidably mounted on the valve body reciprocatively to operate the valve mechanism, the valve mechanism including at least first valve means disposed in the valve body and second valve means mounted on the input shaft. In accordance with the present invention, a valve member is slidably disposed within the valve body to define the first valve means so that when the solenoid is energized, the valve member moves relative to the valve body in response to the solenoid plunger to operate the valve mechanism. A core member which forms part of a magnetic path for the solenoid is disposed at a location which opposes the direction in which the solenoid plunger is moved so as to be movable relative to the valve body and so as to allow the core member to be linked to the input shaft.

With the described arrangement of the present invention, the core member is mounted to be movable relative to the valve body and can be linked to the input shaft. Accordingly, as the solenoid plunger moves, the core member moves also. This allows the solenoid to be reduced in size, and hence the brake booster to be reduced in size as compared with the cited Application.

Above and other objects, features and advantages of the present invention will become apparent from the following detailed description of several embodiments thereof with reference to the drawings.

BRIEF DESCRIPTION OF THE DRAWINGS

FIG. 5 is a cross section of a brake booster disclosed in Japanese Patent Application No. 222,138/2001.

DETAILED DESCRIPTION OF THE EMBODIMENTS

Figure 1:
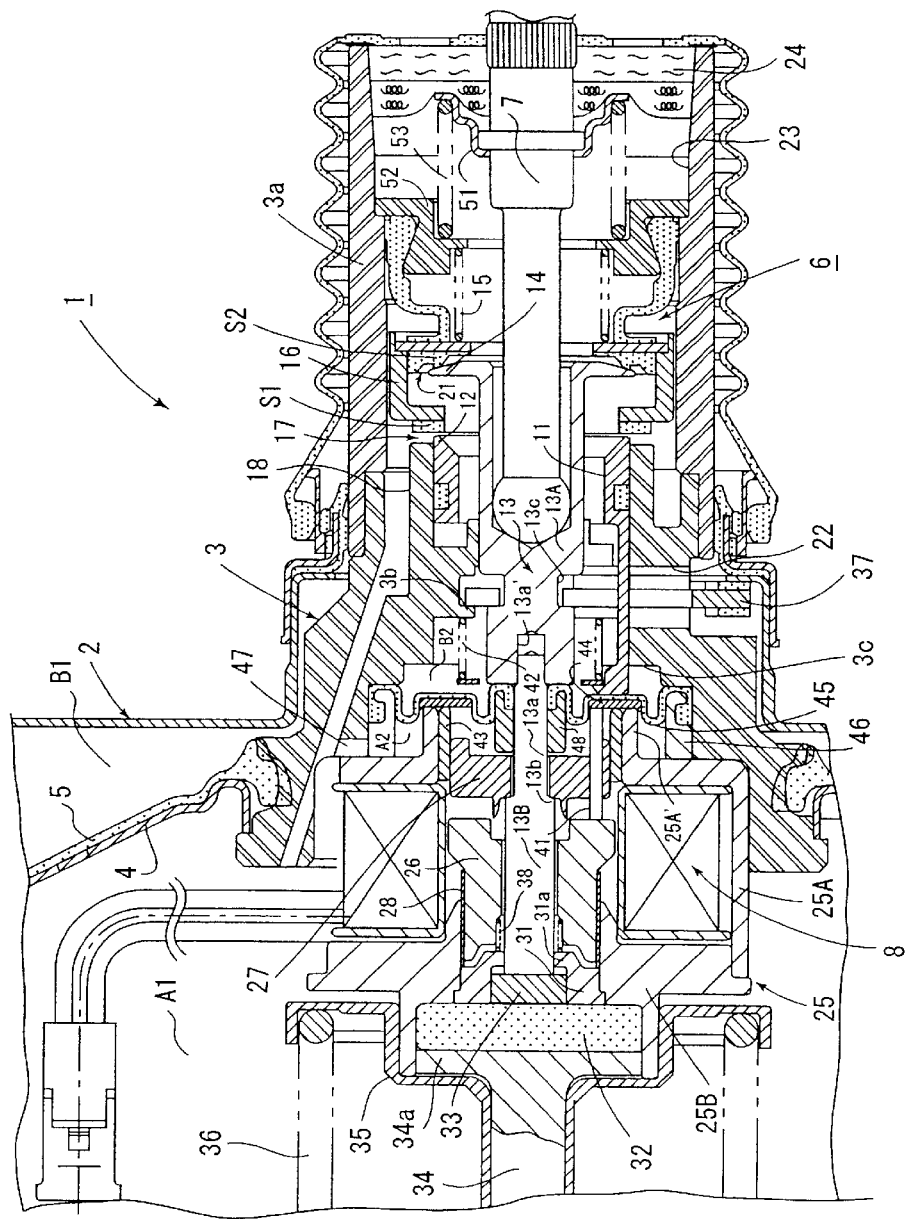
FIG. 1 is a cross section of an essential part of a brake booster 1 according to one embodiment of the present invention.

Referring to the drawings, several embodiments of the present invention will now be described. Referring to FIG. 1, a brake booster 1 has a shell (or a housing) 2 in which a substantially tubular valve body 3 is slidably mounted. A power piston 4 is connected around the outer periphery of the valve body 3, and a diaphragm 5 is applied to the back surface of the power piston 4 to partition the interior of the shell 2 into a constant pressure chamber A1 and a variable pressure chamber B1.

A valve mechanism 6 which supplies a fluid to or displaces it from the variable pressure chamber B1 is disposed inside the valve body 3. The valve mechanism 6 is switchably controlled by an input shaft 7 which is connected to a brake pedal, not shown, and is also switchably controlled by a solenoid 8, the operation of which is controlled by a controller, not shown.

The valve mechanism 6 comprises a substantially cylindrical valve seat member (which is also referred to as "valve member" herein) 11 which is slidably mounted inside the valve body 3, an annular vacuum valve seat 12 formed on the rear end of the valve seat member 11, an annular atmosphere valve seat (or second valve means as termed herein) 14 which is formed to face rearward on a valve plunger 13 which is slidably mounted on the valve body 3, and a tubular valve element 16 which is urged by a spring 15 to be seated upon the vacuum valve seat 12 and the atmosphere valve seat 14 from the rear side.

A combination of the vacuum valve seat 12 and a seat area S1 on the valve element 16 which moves into engagement therewith or disengagement therefrom defines a vacuum valve 17. A space located radially outward of the vacuum valve 17 communicates with the constant pressure chamber A1 through an axial constant pressure passage 18 formed in the valve body 3.

A combination of the atmosphere valve seat 14 and a seat area S2 on the valve element 16 which moves into engagement therewith or disengagement therefrom defines an atmosphere valve 21. A space located between the atmosphere valve 21 and the vacuum valve 17 communicates with the variable pressure chamber B1 through a radial variable pressure passage 22 formed in the valve body 3. Finally, a space located radially inward of the atmosphere valve 21 communicates with the atmosphere through an atmosphere passage 23 which is defined within a tubular terminal portion 3a of the valve body 3. A filter 24 is disposed in the atmosphere passage 23. The constant pressure chamber A1 communicates with a source of negative pressure through a tubing, not shown, which is mounted on the shell 2 to introduce a negative pressure, whereby a negative pressure is normally introduced into the constant pressure chamber A1.

A substantially cylindrical yoke 25 is fitted into the valve body 3 from the front side, and a cylindrical solenoid plunger 26 and a substantially ring-shaped core member 27, both of which are formed of a magnetizable material, are slidably mounted within the yoke 25.

The yoke 25 comprises a stepped tubular outer member 25A which is located rearward and which is fitted into the inner periphery of the valve body 3, and an inner member 25B which is disposed as a press fit into the inner periphery of the front portion of the outer member 25A, and the solenoid 8 is contained in the space defined by the outer member 25A and the inner member 25B. A thin-walled cylinder member 28 is fitted into the inner periphery of the inner member 25B toward the rear end thereof, and the cylinder member 28 includes a rear portion which projects rearward of the inner member 25B. The cylinder member 28 is formed of a non-magnetizable material, and the solenoid plunger 26 includes a front portion of a reduced diameter which is slidably fitted into the inner periphery of the cylinder member 28.

An annular member 31 which is formed of a non-magnetizable material is fitted into the inner periphery of the inner member 25B which is disposed adjacent to and forwardly of the cylinder member 28 and the solenoid plunger 26. A reaction disc 32 is fitted into the inner periphery of the inner member 25B at a location forward of the annular member 31, and a plunger plate 33 is slidably fitted inside the annular member 31 at a location adjacent to and rearward of the reaction disc 32. An output shaft 34 has a base 34a which is slidably fitted into the inner periphery of the front portion of the inner member 25B, and the end face of the base 34a is disposed in abutment against the front end face of the reaction disc 32. Under this condition, the rear end face of the reaction disc 32 is in abutment against the end face of the annular member 31 and against the stepped end face of the inner member 25B which is located radially outward of the annular member 31. In the inoperative position shown, the front end face of the plunger plate 33 is slightly spaced from the rear end face of the reaction disc 32 while the rear end face of the plunger plate 33 abuts against the front end face of the valve plunger 13.

The front end of the output shaft 34 projects externally through a seal member, not shown, from the front end axial portion of the shell 2 for engagement with the piston of a master cylinder, not shown. A funnel-shaped retainer 35 is fitted around the outer periphery of the rear portion of the output shaft 34 and around the outer periphery of the front portion of the inner member 25B, and a return spring 36 is disposed between the retainer 35 and an opposing front wall of the shell 2. Accordingly, the valve body 3 is normally urged rearward under the resilience of the return spring 36, and is maintained at its retracted end position where a key member 37 abuts against the rear wall of the shell 2 and is abutted by a stepped end face 3b.

Toward the rear end, the annular member 31 is formed with a support 31a which extends radially inward, and a spring 38 which is charged to a small load is disposed between the support 31a and an opposing axial portion of the solenoid plunger 26, thus normally urging the solenoid plunger 26 rearward.

In the present embodiment, the solenoid plunger 26 includes a front portion of a reduced diameter and a rear portion of an increased diameter, which are bordered by a tapered portion. As mentioned above, the front portion of the solenoid plunger 26 having a reduced diameter is slidably fitted into the cylinder member 28 while the rear end face of the solenoid plunger 26 is abutted by the front end of an engaging member 41. The engaging member 41 is normally urged forward by a spring 42 which is charged to a higher load than the spring 38. Accordingly, in the inoperative condition shown, the solenoid plunger 26 is maintained at its foremost position where an annular plate 44 which abuts against the rear end of the engaging member 41 is in abutment against the rear end of the outer member 25A.

A rear portion of the outer member 25A is formed as a portion 25A' of a reduced diameter, and a cylindrical bearing member 43 is fitted into the inner periphery of the portion 25A' of a reduced diameter. The bearing member 43 is formed of a magnetizable material, but a coating of a non-magnetizable material is applied to the entire inner periphery of the bearing member 43. The outer periphery of the core member 27, which comprises a magnetizable material, is slidably fitted into the inner periphery of the bearing member 43. The bearing member 43 has the same axial size as the portion 25A' of a reduced diameter, but the bearing member 43 has an inner diameter which is slightly less than the increased diameter at the rear end of the solenoid plunger 26.

As will be described in detail later, the inner periphery of the core member 27 is mounted at a given position of the valve plunger 13, and accordingly, the core member 27 is adapted to be driven axially back and forth together with the valve plunger 13 relative to the valve body 3. The front end face of the core member 27 is disposed in opposing relationship with the rear end face of the solenoid plunger 26.

When the solenoid 8 is energized by a controller, not shown, the outer member 25A, the inner member 25B, the solenoid plunger 26 and the core member 27 form together a magnetic path, whereby the solenoid plunger 26 is driven rearward relative to the valve body 3 against the resilience of the spring 42. When the solenoid plunger 26 moves rearward in this manner, the valve seat member 11 also moves rearward in response thereto, whereby the vacuum valve seat 12 abuts against the seat area S1 to push back the valve element 16 rearward. Consequently, the vacuum valve 11 is closed while the atmosphere valve seat 14 is removed from the seat area S2 to open the atmosphere valve 12. Thus, when the solenoid 8 is energized in the inoperative condition shown, the brake booster 1 can be actuated without depressing a brake pedal.

The solenoid plunger 26 which moves rearward as the solenoid 8 is energized allows a diaphragm 45 bonded with the annular plate 44 which is linked with the engaging member 41 to move to a position where it abuts against the stepped end face 3c of the valve body 3. In other words, the solenoid plunger 26 and the valve seat member 11 are axially movable relative to the valve body 3 in a range in which the annular plate 44 can move between the stepped end face 3c and the outer member 25A.

In the present embodiment, an arrangement is made to avoid the abutment of the rear end face of the solenoid plunger 26 against the core member 27 as it is driven rearward when the solenoid 8 is energized. A distance by which the core member 27 is spaced from the solenoid plunger 26 in the inoperative condition shown is chosen to be a minimum distance which avoids an abutment between the both members when the solenoid 8 is energized.

In other words, a stop position of the core member relative to the solenoid plunger 26 in the inoperative position when the solenoid 8 is not energized is chosen in a range which avoids the abutment of the solenoid plunger 26 against the core member 27 when the solenoid 8 is energized to drive the solenoid plunger 26 rearward.

In this manner, in the present embodiment, the core member 27 moves rearward in accordance with a rearward movement of the solenoid plunger 26, and accordingly, the core member 27 can be disposed to a closer position to the solenoid plunger 26 than in the prior art, as will be further discussed later. Consequently, in comparison to the prior art shown in FIG. 5 (according to Japanese Patent Application No. 222,138/2001) in which the core member 27 is fixedly mounted within the valve body 3, the magnitude of the current which is fed to the solenoid 8 in order to move the solenoid plunger 26 can be reduced. Accordingly, in the present embodiment, the size of the solenoid 8 can be reduced, and hence the size of the brake booster 1 can be reduced, in comparison to the cited Application.

A linkage between the solenoid plunger 26 and the valve seat member 11 will now be described. The valve seat member 11 is slidably fitted into the inner periphery of the valve body 3 while maintaining a hermetic seal therebetween, and is normally urged forward by the spring 42.

The diaphragm 45 is disposed between the front end of the valve seat member 11 and the rear end of the outer member 25A, and the annular plate 44 is applied to the diaphragm 45 at a given front position. Since the valve seat member 11 is urged forward by the spring 42, the front end of the valve seat member 11 abuts against the diaphragm 45 at the position where the annular plate 44 is bonded, and the annular plate 44 in turn abuts against the rear end of the engaging member 41. The front end of the engaging member 41 abuts against the solenoid plunger 26. At its given position, the core member 27 is formed with an axial through-bore, through which the engaging member 41 is passed to be disposed in abutment against the solenoid plunger 26, thus allowing the core member 27 and the solenoid plunger 26 to move toward and away from each other.

The solenoid plunger 26 is normally urged by the spring 42 through the engaging member 41, the annular plate 44, the diaphragm 45 and the valve seat member 11, and in the inoperative condition shown, the solenoid plunger 26 is at rest at its foremost position where the annular plate 44 abuts against the rear end of the outer plate 25A.

When the solenoid 8 is deenergized, the solenoid plunger 26 is maintained at its inoperative position shown, where the vacuum valve seat 12 is spaced from the seat area S1 to open the vacuum valve 17.

By contrast, when the solenoid 8 is energized, the solenoid plunger 26 is driven axially rearward, whereby the valve seat member 11 is also driven rearward to close the vacuum valve 17 while opening the atmosphere valve 21.

The outer periphery of the diaphragm 45 which acts as a pressure-responsive area is connected by an annular member 46 to the inner periphery of the valve body 3 while maintaining a hermetic seal, while the inner periphery of the diaphragm 45 is connected to the outer periphery of the valve plunger 13 while maintaining a hermetic seal. As a consequence, a constant pressure chamber A2 is defined forwardly of the diaphragm 45 while a variable pressure chamber B2 is defined rearward of the diaphragm 45. The constant pressure chamber A2 communicates with the constant pressure chamber A1 through a radial communication passage 47 formed in the valve body 3, while the variable pressure chamber B2 communicates with the variable pressure chamber B1 through the variable pressure passage 22.

The diaphragm 45 has a flexibility, and accordingly, the valve plunger 13 can be driven back and forth relative to the valve body 3 in the inoperative condition shown where the annular plate 44 abuts against the outer member 25A.

As mentioned above, in the present embodiment, when the solenoid 8 is energized in the inoperative condition shown, the solenoid plunger 26 and the valve seat member 11 are driven rearward to close the vacuum valve 17 and to open the atmosphere valve 21, thus actuating the brake booster 1. A pressure differential between the constant pressure chamber A2 and the variable pressure chamber B2 urges the annular plate 44 and the diaphragm 45, acting as pressure-responsive areas, forward, and the pressure in the variable pressure chamber B1 is controlled so that the forwardly urging force which results from the pressure differential is balanced with the rearwardly urging force applied to the solenoid plunger 26 which results from the energization of the solenoid 8.

The valve plunger 13 on which the inner peripheries of the core member 27 and the diaphragm 45 are mounted will now be described. In the present embodiment, the valve plunger 13 comprises a plunger member 13A which is located rearward, a rod member 13B which is located forwardly, and a cylinder member 48 which secures the diaphragm 45 around the outer periphery of the rear portion of the rod member 13B.

The atmosphere valve seat 14 is formed on the rear end face of the plunger member 13A which is located rearward, and an input shaft 7 is connected to a bottomed opening which is formed in the rear end face of the plunger member 13A. An annular groove 13c is formed around the outer periphery of the front portion of the plunger member 13A, and is engaged by the key member 37.

The outer periphery of the plunger member 13A is passed through the valve member 11 before it is slidably fitted into the inner periphery of the valve body 3. A bottomed opening 13a' is formed in the front end face of the plunger member 13A, and a rear portion of a reduced diameter of the rod member 13B is fitted into the bottomed opening 13a', whereby the rod member 13B and the plunger member 13A are connected together integrally.

The cylinder member 48 is fitted around the rear portion of a reduced diameter of the rod member 13B, and the inner periphery of the diaphragm 45 is engaged between a recess formed in the rear end face of the cylinder member 48 and the outer periphery of the rod member 13B. The diaphragm 45 which assumes this condition is held sandwiched between the rear end face of the rod member 13B and the front end face of the plunger member 13A, thus connecting the inner periphery of the diaphragm 45 to the outer periphery of the cylinder member 48 while maintaining a hermetic seal therebetween.

The inner periphery of the core member 27 is loosely fitted around the portion of a reduced diameter of the rod member 13B. Since the core member 27 is held sandwiched between a step 13b of the rod member 13B and the cylinder member 48, the core member 27 is substantially connected to a given axial position of the valve plunger 13 substantially in an integral manner. A front portion of the rod member 13B which has an increased diameter is passed through the solenoid plunger 26 and then slidably extends through the support 31a of the annular member 31. The front end face of the rod member 13B, which represents the front end face of the valve plunger 13, is disposed in abutment against the plunger plate 33.

The valve plunger 13 is constructed in the manner mentioned above, and the core member 27 is connected to the valve plunger 13. Accordingly, the core member 27 is adapted to be driven back and forth together with the valve plunger 13.

A plate 51 is carried by the input shaft 7, and a poppet return spring 53 is disposed between the plate 51 and a retainer 52 which is disposed inside the valve body 3, thus normally urging the input shaft 7 and its connected valve plunger 13 rearward.

The valve plunger 13 is formed with the annular groove 13c, in which the distal end of the key member 37 is engaged. The key member 37 is displaceable axially on the valve body 3 within the variable pressure passage 22, whereby the key member 37 and valve plunger 13 are allowed to move axially of the valve body 3 within an extent of the axial length of the annular groove 13c.

In the inoperative condition shown, the key member 37 abuts against the wall of the shell 2 and remains at rest, and the key member 37 is abutted by the step end face 3d to maintain the valve body 3 at its inoperative position. In addition, the front end face of the annular groove 13c abuts against the key member 37 to maintain the valve plunger 13 at its inoperative position. The valve seat member 11 and the solenoid plunger 26 remain stationary at a position where the annular plate 44 which is urged by the spring 42 abuts against the rear end of the outer member 25A.

In this inoperative condition, the core member 27 is maintained at a position where it is most close to the solenoid plunger 26 within an extent in which it cannot be abutted by the solenoid plunger 26 which is driven rearward when the solenoid 8 is energized.

In the present embodiment, the annular member 31 is fitted inside the inner member 25B, and accordingly, when a brake reaction acts on the reaction disc 32, the brake reaction is transmitted to the input shaft 7 through the plunger plate 33 and the valve plunger 13.

Operation

With the described arrangement, in the inoperative condition shown in FIG. 1, a controller, not shown, deenergizes the solenoid 8, and the valve seat member 11 and the solenoid plunger 26 are maintained in their inoperative positions shown.

On the other hand, the key member 37 abuts against the rear wall of the shell 2, whereby its retracting movement is restricted. The retracting movement of the valve body 3 is also restricted by the abutment of its stepped end face 3b against the key member 37. The valve plunger 13 is maintained in its inoperative position shown as a result of the abutment of the front end face of the annular groove 13c against the key member 37. The core member 27 which is mounted on the valve plunger 13 is also maintained in its inoperative position shown.

Under the inoperative condition mentioned above, the seat area S2 on the valve element 16 is seated upon the atmosphere valve seat 14 to close the atmosphere valve 21, and accordingly, a communication of the variable pressure chambers B1 and B2 with the atmosphere is interrupted. On the other hand, the seat area S1 on the valve element 16 is removed from the vacuum valve seat 12 to open the vacuum valve 17, and accordingly, the constant pressure chamber A1 communicates with the variable pressure chambers B1 and B2. Thus, the constant pressure chamber A1 and the variable pressure chamber B1 across the power piston 4 assume an equal pressure as do the constant pressure chamber A2 and the variable pressure chamber B2 across the diaphragm 45.

Normal Brake Operation

When a brake pedal, not shown, is depressed under the inoperative condition, the input shaft 7 and the valve plunger 13 are driven forward relative to the valve body 3. Even though the core member 27 moves forwardly within the valve body 3 together with the valve plunger 13, it does not abut against the solenoid plunger 26.

As the valve plunger 13 is driven forward, the seat area S1 on the valve element 16 becomes seated upon the vacuum valve seat 12 to close the vacuum valve 17, while the seat area S2 on the valve element 16 becomes removed from the atmosphere valve seat 14 on the valve plunger 13 to open the atmosphere valve 21. Thus, the communication between the constant pressure chamber A1 and the variable pressure chamber B1 is interrupted, and the variable pressure chamber B1 communicates with the atmosphere. This develops a pressure differential between the constant pressure chamber A1 and the variable pressure chamber B1 disposed across the power piston 4, whereby an output from the power piston 4 which results from the pressure differential is transmitted through the output shaft 34 to the piston of a master cylinder, not shown, thus developing a master cylinder liquid pressure.

At this time, part of the output transmitted to the output shaft 34 is transmitted, as a reaction, from the reaction disc 32 to its abutting plunger plate 33 and thence to the valve plunger 13, and the output is controlled so that the reaction is balanced with the input applied to the input shaft 7. In this manner, a servo balance condition in which the vacuum valve 17 and the atmosphere valve 21 are closed simultaneously is reached.

When the brake pedal is released from the depression under the servo balance condition mentioned above, the valve plunger 13 is driven by the resilience of the poppet return spring 53 to retract relative to the valve body 3, together with the input shaft 7 while overcoming the pressure differential, whereby the seat area S1 on the valve element 16 becomes removed from the vacuum valve seat 12 to allow the variable pressure chambers B1 and B2 to communicate with the constant pressure chamber A1 again. This allows the atmosphere which has been introduced into the variable pressure chambers B1 and B2 to be discharged, permitting the valve body 3 to retract to its inoperative position shown.

It should be noted that during the normal brake operation, the solenoid plunger 26, the engaging member 41, the annular plate 44 and valve seat member 11 cannot move axially relative to the valve body 3 because they are urged forward by the spring 42.

Automatic Brake Operation

Figure 2:
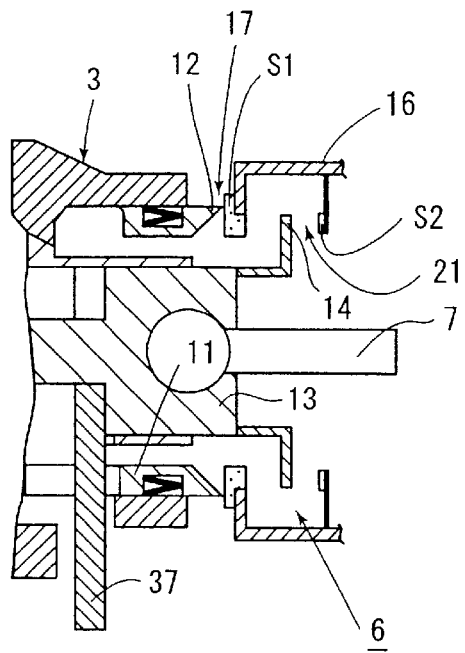
FIG. 2 is a schematic view of a valve mechanism shown in FIG. 1 when it is operated.

When the solenoid 8 is energized by the controller, not shown, under the inoperative condition shown, the solenoid plunger 26 and its linked valve seat member 11 are driven rearward against the resilience of the spring 42. The vacuum valve seat 12 on the valve seat member 11 then becomes seated upon the seat area S1 on the valve element 16 to close the vacuum valve 17, thus interrupting the communication between the constant pressure chamber A1 and the variable pressure chambers B1 and B2. In addition, the valve seat member 11 causes the valve element 16 to move rearward (see FIG. 2). Accordingly, the seat area S2 on the valve element 16 becomes removed from the atmosphere valve seat 14 on the valve plunger 13 to open the atmosphere valve 21, thus allowing the variable pressure chamber B1 to communicate with the atmosphere.

This develops a pressure differential between the constant pressure chamber A1 and the variable pressure chamber B1 disposed across the power piston 4, thus driving the valve body 3 forward to deliver a brake output.

At this time, the pressure which prevails in the variable pressure chamber B1 is supplied to the variable pressure chamber B2, and accordingly, the diaphragm 45 (or annular plate 44) acting as a pressure responsive area is subject to the pressure in the constant pressure chamber A2 and the pressure in the variable pressure chamber B2. The pressure differential therebetween urges the diaphragm 45 forward, and such force is transmitted through the engaging member 41 to urge the solenoid plunger 26 forward. In this manner, the pressure which prevails in the variable pressure chamber B1 is controlled so that the rearwardly urging force which results from the energization of the solenoid plunger 26 is balanced with the forwardly urging force on the solenoid plunger 26 which results from the pressure differential across the diaphragm 45. It is to be noted that at this time, because the plunger plate 33 is contained inside the annular member 31, the brake reaction from the reaction disc 32 is fully responded by the annular plate 31 and the inner member 25B and does not act upon the valve plunger 13.

In the resulting servo balance condition, the valve seat member 11 moves rearward relative to the valve body 3, whereby the valve plunger 13 moves rearward relative to the valve body 3 so that the atmosphere valve seat 14 abuts against the seat area S2 on the valve element 16 which moves rearward. At this time, the core member 27 which is mounted on the valve plunger 13 also moves rearwards relative to the valve body 3, and hence, if the solenoid plunger 26 moves rearward, it cannot abut against the core member 27. For this reason, the core member 27 can be positioned most close to the solenoid plunger 26 under the inoperative condition, thus allowing the magnitude of the current which is fed to energize the solenoid 8 in order to move the solenoid plunger 26 can be reduced. Consequently, the size of the solenoid 8 itself can be reduced in the present embodiment, which leads to a reduced size of the entire brake booster 1.

When the solenoid 8 is deenergized in the servo balance condition, the valve seat member 11 and the solenoid plunger 26 are returned to their original inoperative positions under the influence of the spring 42, and the valve body 3 is also returned to its inoperative position shown by the return spring 36.

Brake Assist Operation During an Emergency Brake Use

The brake booster 1 can function as an assist brake during an emergency brake operation, which will be described below.

When the brake pedal is quickly depressed in the inoperative condition shown, the controller is arranged to determine that a brake assist operation is required in response to a signal from a sensor, not shown. When the controller determines that a brake assist operation is required, it immediately energizes the solenoid 8.

As the solenoid 8 is energized, the solenoid plunger 26 and the valve seat member 11 are driven rearward relative to the valve body 3, in the similar manner as occurs during the automatic brake operation mentioned above (see FIG. 2), and accordingly, the vacuum valve seat 12 becomes seated upon the seat area S1 to close the vacuum valve 17 rapidly while opening the atmosphere valve 21 to a greater opening to allow the brake booster 1 to be actuated to deliver an increased output rapidly.

Forces acting upon the solenoid plunger 26 in the servo balance condition which is reached during the brake assist operation are mentioned below.

Denoting the forwardly urging force which results from the pressure differential between the constant pressure chamber A2 and the variable pressure chamber B2 disposed across the diaphragm 45 by DP1, the rearwardly urging force on the solenoid plunger 26 which results from the magnetic force from the solenoid 8 by SP2, the input applied to the input shaft 7 by IP3, the resilience of the spring 38 by S1 and the resilience of the spring 42 by S2, these forces are related to each other as follows:

$$DP1=SP2-IP3+S1-S2$$

Since the forwardly urging force DP1 which results from the pressure differential across the diaphragm 45 is proportional to the output from the brake booster 1, the output from the brake booster 1 can be increased as compared with the output which is obtained during the normal brake operation by causing the current fed to the solenoid 8 to be controlled by the controller in accordance with the input.

Second Embodiment

Figure 3:
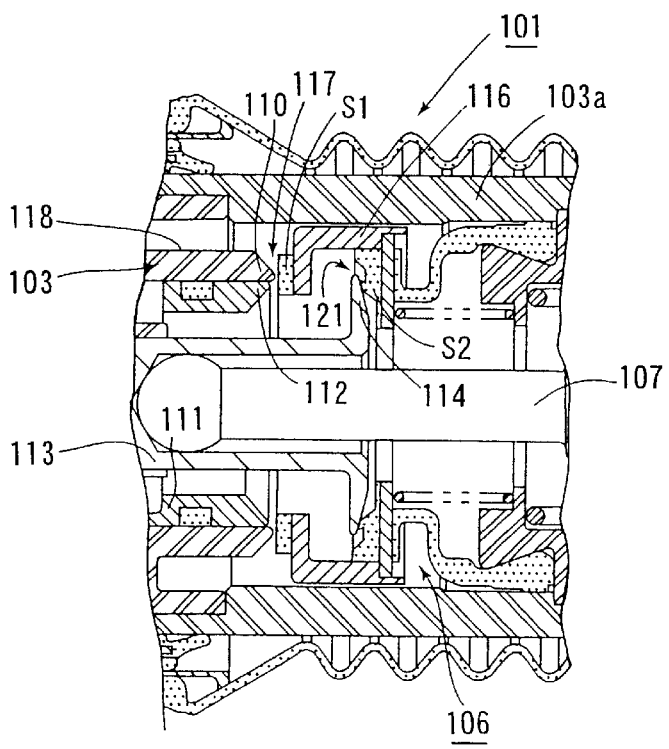
FIG. 3 is a cross section of an essential part of a second embodiment of the present invention.

FIG. 3 shows a second embodiment of the present invention. In the first embodiment mentioned above, the vacuum valve seat 12 comprises only the rear end of the valve seat member 11, but in the second embodiment, juxtaposed vacuum valve seats are formed by a step of a valve body 103 and the rear end of a valve seat member 111. Specifically, an annular, first vacuum valve seat 110 is formed on a stepped end face of the valve body 103 which faces rearward in the similar manner as known in the art, and the rear end of the valve seat member 111 is provided with a second vacuum valve seat 112 in the same manner as in the first embodiment. An arrangement is made so that the second vacuum valve seat 112 is disposed forwardly of the first vacuum valve seat 110 in the inoperative condition shown. Accordingly, in the second embodiment, a vacuum valve 117 is formed by both vacuum valve seats 110, 112 and a seat area S1 on a valve element 116 which moves into engagement therewith or disengagement therefrom. In other respects, the arrangement is similar to the first embodiment, and accordingly, corresponding parts to those shown in the first embodiment are designated by like reference numerals as used before, to which 100 is added.

In the second embodiment, unless a solenoid 108, not shown, is energized, the valve seat member 111 cannot be moved axially relative to the valve body 103, and accordingly, during a normal brake operation in which the brake pedal is gently depressed, only the first vacuum valve seat 110 moves into engagement with or disengagement from the seat area S1 to close or open the vacuum valve 117.

By contrast, during the automatic brake operation where the solenoid 108 is energized or during the emergency brake operation where the brake pedal is quickly depressed, a solenoid plunger 126 is driven rearward within the valve body 103, and accordingly, the valve seat member 111 also moves rearward, whereby the second vacuum valve seat 112 projects rearward beyond the first vacuum valve seat 110 to be seated upon the seat area S1 on the valve element 116, causing it to move rearward.

As a consequence, it will be apparent that the second embodiment is also capable of achieving a similar functioning and effect as achieved by the first embodiment.

Third Embodiment

Figure 4:
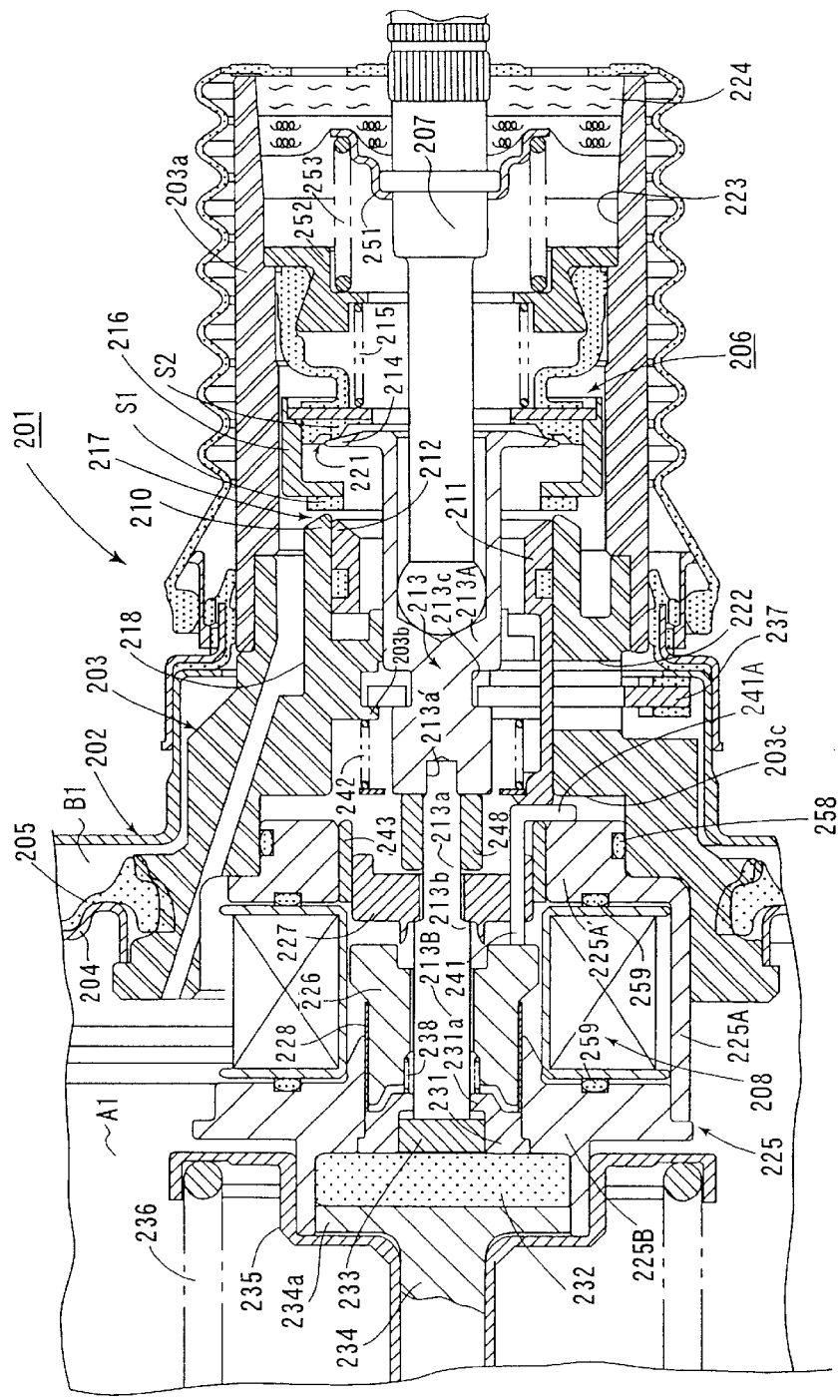
FIG. 4 is a cross section of a third embodiment of the present invention.

FIG. 4 shows a third embodiment of the present invention. In the third embodiment, parts corresponding to those shown in the first embodiment are designated by like reference numerals as used before, to which 200 is added. In the third embodiment, the diaphragm 45 and the annular plate 44 which are used in the first embodiment are eliminated, and a vacuum valve 217 comprises a combination of juxtaposed first vacuum valve seat 210 and second vacuum valve seat 212 and a seat area S1. As a result of eliminating the diaphragm 45, the annular member 46 is also eliminated, thus avoiding the use of the constant pressure chamber A2 and the variable pressure chamber B2. An outer member 225A has a portion 225A' of a reduced diameter which has a greater wall thickness than that shown in the first embodiment, and the external diameter of the portion 225A' is increased so that it may be fitted into the inner periphery of a valve body 203. An annular seal member 258 is mounted in the outer periphery of the portion 225A' to maintain a hermetic seal between the outer periphery of the portion 225A' and the inner periphery of the valve body 203. Annular seal members 259 are mounted in the outer member 225A and an inner member 225B at locations which opposes the opposite end faces of a spool of a solenoid 208, thus maintaining a hermetic seal at these locations.

An engaging member 241 has a rear end which is folded into L-configuration, and a folded portion 241A is positioned between a stepped end face 203c of the valve body 203 and the rear end face of the outer member 225A (the portion 225A' of a reduced diameter). Since the front end of a valve seat member 211 is disposed in abutment against the front end portion 241A, in the inoperative condition shown, the folded portion 241A remains at rest in abutment against the rear end face of the outer member 225A (the portion 225A' of a reduced diameter).

As a result of the described arrangement, in the third embodiment, a solenoid plunger 226 and the valve seat member 211 can move axially relative to the valve body 203 through a distance by which the folded portion 241A can move between the stepped end face 203c of the valve body 203 and the rear end face of the outer member 225A (the portion 225A' of a reduced diameter).

In the third embodiment, a second vacuum valve seat 212 is located forwardly of the first vacuum valve seat 210, in the similar manner as shown in the second embodiment. In other respects, the arrangement is similar to the first embodiment, and accordingly, corresponding parts will not be described specifically.

In the described arrangement of the third embodiment, the force which urges the solenoid plunger 226 rearward cannot act on the valve plunger 213 and the input shaft 207.

Operation of Third Embodiment

The operation of the third embodiment constructed in the manner mentioned above will now be described. In the inoperative condition shown in FIG. 4, a controller, not shown, does not energize the solenoid 208, and under this condition, the valve seat member 211 and the solenoid plunger 226 are maintained in their inoperative positions shown.

On the other hand, a key member 237 abuts against the rear wall of a shell 202, whereby its retracting movement is limited. A retracting movement of the valve body 203 is limited by abutment of a stepped end face 203b thereof against the key member 237. A valve plunger 213 is maintained in its inoperative position shown by the abutment of the front end face of an annular groove 213c against the key member 237. A core member 227 which is mounted on the valve plunger 213 is maintained in its inoperative position shown.

Under the inoperative condition, a seat area S2 on the valve element 216 is seated upon an atmosphere valve seat 214 to close an atmosphere valve 221, thus interrupting the communication of the variable pressure chamber B1 with the atmosphere. A seat area S1 on the valve element 216 is removed from the first vacuum valve seat 210 and the second vacuum valve seat 212 to open the vacuum valve 217. Accordingly, the constant pressure chamber A1 communicates with the variable pressure chamber B1, and a negative pressure is introduced into these chambers.

Normal Brake Operation

When a brake pedal, not shown, is depressed in the inoperative condition, the input shaft 207 and the valve plunger 213 are driven forward relative to the valve body 203. Even though the core member 227 is driven forward within the valve body 203 together with the valve plunger 213, it does not abut against the solenoid plunger 226.

The seat area S1 on the valve element 216 then becomes seated on the first vacuum valve seat 210 to close the vacuum valve 217 while the seat area S2 on the valve element 216 is removed from the atmosphere valve seat 214 to open the atmosphere valve 221, thus interrupting the communication between the constant pressure chamber A1 and the variable pressure chamber 1 and allowing the variable pressure chamber B1 to communicate with the atmosphere. A pressure differential is then developed between the constant pressure chamber A1 and the variable pressure B1 disposed across a power piston 204, and an output from which results from the pressure differential across the power piston 204 is transmitted through an output shaft 234 to the piston of a master cylinder, not shown, developing a master cylinder liquid pressure.

At this time, part of the output transmitted to the output shaft 234 is transmitted, as a reaction, from a reaction disc 232 through a plunger plate 233 to the valve plunger 213, and the output is controlled so that a balance is reached between the reaction and the input applied to the input shaft 207. Thus, a servo balance condition is reached in which the vacuum valve 217 and the atmosphere valve 221 are closed simultaneously.

If the brake pedal is released from depression in the servo balance condition, the valve plunger 213 retracts together with the input shaft 207 relative to the valve body 203 under the resilience of a poppet return spring 253. Thereupon, the seat area S1 on the valve element 216 is removed from the first vacuum valve seat 210 to allow the variable pressure chamber B1 to communicate with the constant pressure chamber A1 again. This allows the atmosphere which has been introduced into the variable pressure chamber B1 to be vented to the constant pressure chamber A1, thus allowing the valve body 203 to be retracted to its inoperative position shown.

It should be noted that during the normal brake operation, the solenoid plunger 216, the engaging member 241 and the valve seat member 211 are urged forward by the spring 242, and therefore cannot move axially relative to the valve body 203.

Brake Assist Operation During an Emergency Brake Use

When the brake pedal is quickly depressed in the inoperative condition shown, the controller is arranged to determine that a brake assist operation is required in response to a signal from a sensor, not shown. At the time the controller determines that a brake assist operation is required, it energizes the solenoid 208 immediately. The solenoid plunger 226 and the valve seat member 211 are then driven rearward relative to the valve body 203.

This causes the second vacuum valve seat 212 to move rearward beyond the first vacuum valve seat 210 and is then seated upon the seat area S1 on the valve element 216, thus rapidly closing the vacuum valve 217 while opening the atmosphere 221 to a greater opening and thus the brake booster is actuated to allow an increased output to be obtained rapidly.

When the brake booster 201 is actuated in this manner, the input shaft 207 and the valve plunger 213 retracts rearward relative to the valve body 203 until the atmosphere valve seat 214 on the valve plunger 213 abuts against the seat area S2 on the valve element 216 which moves rearward. Accordingly, a clearance between the front end face of the valve plunger 213 (or rod member 213B) and the end face of the reaction disc 232 increases to a greater value than during a normal operation, thus increasing the output. The valve plunger 213 moves rearward relative to the valve body 203 in this manner, and the core member 227 also moves rearward relative to the valve body 203 as the valve plunger 213 moves rearward. Accordingly, the solenoid plunger 226, which moves rearward upon energization of the solenoid 208, cannot abut against the core member 227.

When the brake pedal is released from the depression in the actuated condition, the controller deenergizes the solenoid 208, whereby the valve body 203 and other members return to their inoperative positions shown.

Automatic Brake Operation

When the solenoid 208 is energized by the controller in the inoperative condition without depressing the brake pedal, the solenoid plunger 226 and the valve seat member 211 move rearward relative to the valve body 203. Accordingly, the second vacuum valve seat 212 moves rearward beyond the first vacuum valve seat 210 before it is seated upon the seat area S1 on the valve element 216 to close the vacuum valve 217 rapidly while the atmosphere valve 221 is opened to a greater opening to actuate the brake booster 1 to allow an increased output to be obtained therefrom rapidly.

It is to be noted that in the third embodiment, the diaphragm 45 used in the first embodiment is eliminated, and accordingly, when the solenoid 208 is energized, the brake booster 201 is immediately actuated with a full load.

When the solenoid 208 is deenergized, the valve body 203 and other members return to their inoperative positions shown.

The third embodiment is again capable of achieving a similar functioning and effect as achieved by the first embodiment.

Fourth Embodiment

While not shown, a fourth embodiment may be contemplated in which the first vacuum valve seat 110 provided on the step end face of the valve body 203 is omitted to leave the second vacuum valve seat 212 alone to define the vacuum valve seat in the arrangement of the third embodiment shown in FIG. 4. In other respects, the arrangement of the fourth embodiment will be similar to the third embodiment. Again, the fourth embodiment is capable of achieving a similar functioning and effect as achieved by the third embodiment.

The described embodiments relate to a vacuum booster in which a booster operation takes place by utilizing a pressure differential between the vacuum and the atmosphere, but the invention is not limited thereto, but is equally applicable to any booster including a solenoid which can be energized to operate a solenoid plunger in order to operate a valve mechanism. For example, the invention is applicable to a liquid pressure booster in which a booster operation takes place by a liquid pressure or a booster which uses a spool valve as a valve mechanism.

While the invention has been described above in connection with several embodiments thereof, it should be understood that a number of changes, modifications and substitutions therein are possible from the above disclosure without departing from the spirit and the scope of the invention defined by the appended claims.

What is claimed is:

1. A brake booster comprising a valve body slidably disposed within a housing, a power piston mounted on the valve body to partition the interior of the housing into a constant pressure chamber and a variable pressure chamber, a valve mechanism disposed within the valve body to supply a fluid to or to displace it from the variable pressure chamber, an input shaft to operate the valve mechanism, and a solenoid for driving a solenoid plunger which is slidably mounted on the valve body reciprocatively to operate the valve mechanism, the valve mechanism including at least first valve means disposed within the valve body and second valve means mounted on the input shaft;

further comprising a valve member slidably mounted in the valve body and defining the first valve means such that the energization of the solenoid causes the valve member to move relative to the valve body in linked relationship with the solenoid plunger to operate the valve mechanism, a core member forming part of a magnetic path for the solenoid being positioned so as to oppose the direction in which the solenoid plunger is operated and so as to be movable relative to the valve body, the core member being arranged such that it can be linked to the input shaft.

2. A brake booster according to claim 1 in which the valve member includes a pressure-responsive area, an urging force which results from a pressure differential between the pressure in the variable pressure and the pressure in the constant pressure chamber which acts upon the pressure-responsive area being balanced with an urging force on the solenoid plunger which results from the energization of the solenoid when the solenoid is energized, thus allowing a brake output which depends on the energization of the solenoid to be delivered.

3. A brake booster according to claim 1 in which the first valve means comprises a vacuum valve seat and the second valve means comprises an atmosphere valve seat, the valve mechanism also including a valve element which can be seated upon the vacuum valve seat and the atmosphere valve seat, the arrangement being such that when the brake booster is inoperative, the vacuum valve seat is removed from the valve element while the atmosphere valve seat is seated on the valve element and when the solenoid is energized, the solenoid plunger operates the vacuum valve seat in a direction to be seated on the valve element.

4. A brake booster according to claim 3 in which the first valve means formed on the valve member comprises a second valve seat while the valve body is integrally formed with a first vacuum seat which is juxtaposed with the second vacuum valve seat.

5. A brake booster according to claim 4 in which the second vacuum valve seat is disposed forwardly of the first vacuum valve seat when the solenoid is not energized, but when the input shaft is driven forward, the valve element is seated on the first vacuum valve seat and when the solenoid is energized, the second vacuum valve seat is seated on the valve element in linked relationship with the solenoid plunger.

6. A brake booster according to claim 1 in which when the solenoid is energized and a balance condition is reached in which the solenoid plunger operates the valve mechanism, the core member moves rearward relative to the valve body in linked relationship with the input shaft.

* * * * *